United States Patent Office 3,020,456
Patented Feb. 6, 1962

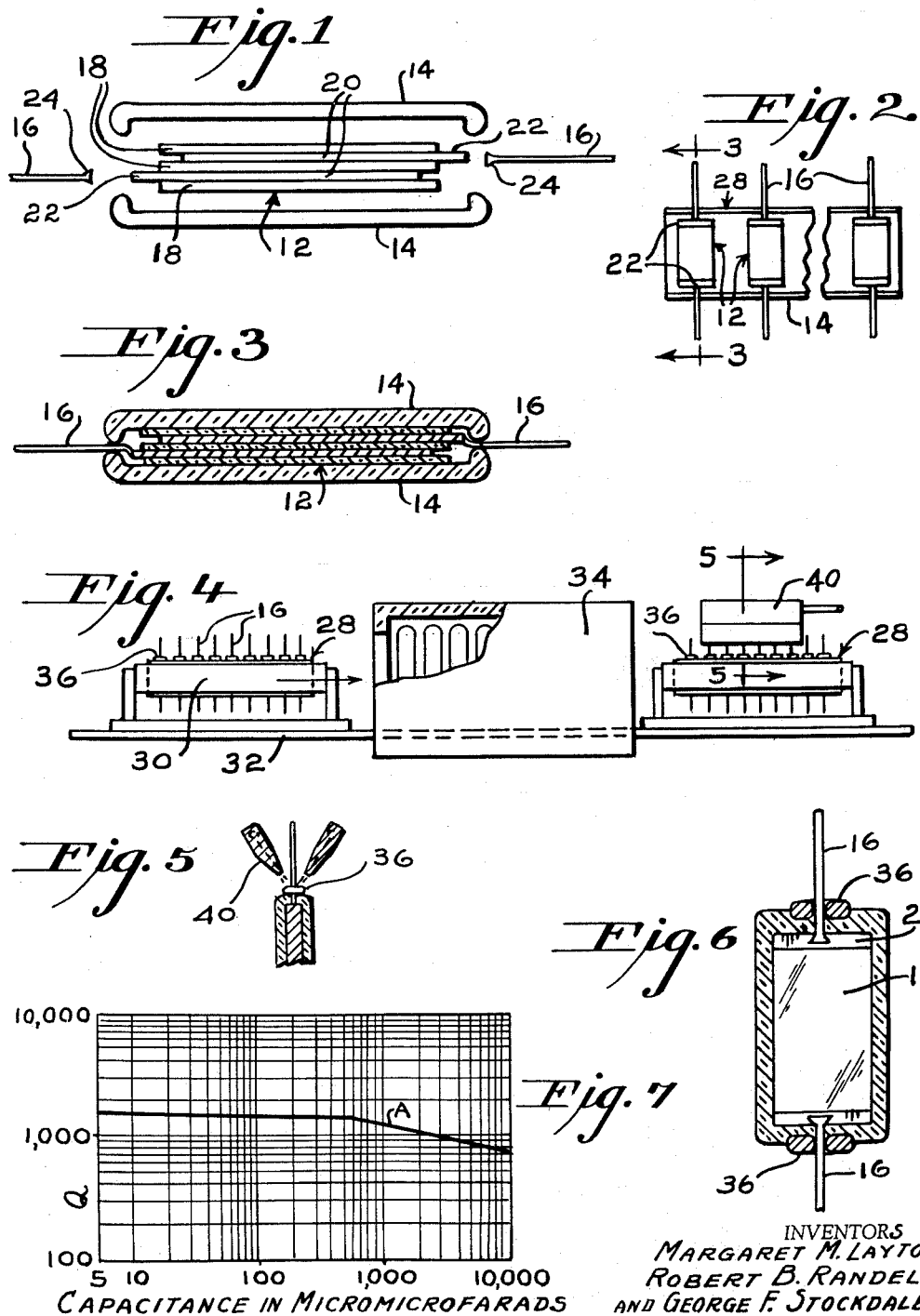

3,020,456
ELECTRICAL CAPACITORS AND METHOD OF PRODUCTION
Margaret M. Layton, Corning, Robert B. Randels, Painted Post, and George F. Stockdale, Corning, N.Y., assignors to Corning Glass Works, Corning, N.Y., a corporation of New York
Filed May 5, 1959, Ser. No. 811,135
7 Claims. (Cl. 317—258)

This invention relates generally to electrical capacitors of the type described in U.S. Patent No. 2,696,577, issued to G. P. Smith. It is particularly concerned with improvements in capacitor encapsulation and electrical lead design to provide a hermetically encapsulated capacitor.

In the glass capacitor of the Smith patent, thin strips of glass are employed as dielectric material and are interleaved with metal foil electrodes to form a stack. The stack is encased between shaped glass covers, and the entire assembly consolidated by application of heat and pressure to produce a glass encapsulated glass capacitor.

Such capacitors provide superior electrical properties and a compact integral construction well adapted to miniaturized electrical systems. Experience has demonstrated, however, that utilization under certain environmental conditions requires a combination of properties which has heretofore appeared incompatible. Among these properties are relatively flexible electrical leads, a high Q value in addition to other electrical characteristics, and means for excluding moisture from the encapsulated capacitor.

Flexible electrical leads facilitate assembly of capacitors into electrical systems and minimize transmission of stress to the fragile capacitor element and encapsulation. However, the conventional flexible wire materials, brass and copper, have thermal coefficients of expansion much higher than ordinary glasses. Adhesion of the cover glass to a wire lead during the consolidation step causes stresses to develop on cooling. These stresses result in glass fracture, and it has, therefore, been considered necessary to avoid such adhesion in producing glass encased capacitors in accordance with the Smith patent.

Under conditions of high humidity, salt water spray and the like, moisture enters the capacitor assembly along the lead wire. This has been found to promote an electrochemical reaction at the terminal junction which results in failure of the capacitor. Organic sealants have failed to provide a complete barrier to such moisture entry.

Among the various electrical characteristics of capacitors, prescribed in terms of minimal limits by specifications such as military specification MIL-C-11272A, is the capacitor Q value. As is well known, this value is a dimensionless figure of merit for capacitors that varies inversely with the resistance imparted by various capacitor assembly components. It is numerically equal to the ratio of reactance to resistance and may also be expressed as the reciprocal of the dissipation factor.

In glass capacitors, optimum Q values are obtained by producing the glass dielectric film and the encapsulating covers from a glass of the type disclosed in U.S. Patent No. 2,527,693 issued to W. H. Armistead. These glasses have coefficients of expansion on the order of $$100\text{--}105 \times 10^{-7} \text{ cm./cm./}^\circ\text{C.}$$

It is known that several ferrous alloys possess coefficients of thermal expansion sufficiently close to that of such a glass to permit a fusion seal between the glass and wires produced from these alloys. In attempting to use lead wires produced from such alloys, however, it was found that the ultimate capacitor Q values were prohibitively low, except as the wires were of such large diameter as to be essentially inflexible.

It is a primary purpose of this invention to provide a capacitor construction and method of production that satisfactorily avoids these problems and fulfills the various requirements described. A further purpose is to provide a hermetically encapsulated capacitor. Another purpose is to provide a hermetically sealed glass capacitor having a high Q value. A more specific purpose is to provide a glass encapsulated capacitor having a strong, crack-resistant construction. A further specific purpose is to provide a glass encapsulated capacitor having a fusion seal between the lead wires and the glass casing and means for strengthening such seal against fracture.

The invention provides a hermetically encapsulated capacitor comprising a capacitor element composed of electrodes separated by dielectric material, electrical leads attached to the electrodes and extending through a glass casing that encapsulates the element and is fusion sealed to the leads, and a ceramic, annular disc surrounding each such lead and integrally united with the surface of the glass casing the seal between the lead and the casing being strengthened against fracture without appreciably altering the electrical characteristics of the capacitor assembly.

The invention is illustratively described in connection with a specific embodiment, a glass encapsulated glass capacitor. In the description, reference is made to the accompanying drawing in which:

FIG. 1 is an exploded sectional view of a glass capacitor encapsulated in accordance with the prior art, FIG. 2 is a top plan view of a consolidated capacitor strip embodying the components of FIG. 1, FIG. 3 is a sectional view along line 3—3, FIG. 4 schematically illustrates a sealing apparatus and method for providing improvements in accordance with this invention, FIG. 5 is a partial sectional view along line 5—5, FIG. 6 is a sectional view of a sealed condenser assembly in accordance with the invention, and FIG. 7 is a graphical illustration of minimum acceptable "Q" characteristics for capacitors, as specified in military specification MIL-C-11272A.

The encapsulated capacitor of FIG. 1 includes a capacitor element 12, opposed glass covers 14—14 and electrical leads 16—16. These components may be formed and assembled in accordance with procedures set forth in the earlier mentioned Smith patent and other prior patents there identified. Details not repeated here, are incorporated by reference.

Capacitor element 12 is composed of thin layers of glass 18 interleaved with metal foils 20. The latter are alternately offset, as shown, to provide terminal portions 22 extending beyond the glass. Additional layers of metal foil and glass may be provided if desired. Also, dimensions are somewhat exaggerated and distorted in order to better portray the arrangement. Lead wires 16 are spot welded to terminals 22 and have a flattened or spaded end 24 for this purpose. Glass covers 14 are arranged in opposed relationship to enclose capacitor body 12 with their edges overlying the lead wires as taught in the Smith patent.

In accordance with one feature of our invention, we provide a fusion seal between glass covers 14 and conducting lead wires 16 without undue sacrifice of either wire flexibility or electrical properties. For this purpose a copper clad ferrous alloy is preferred for the conducting lead wires. As indicated earlier, a ferrous alloy wire is unsatisfactory because of its deterimental effect on the over-all Q value of a capacitor. We have now found, however, that adequately high Q values can be achieved in capacitor manufacture by cladding such ferrous alloy conducting wires with a good conducting metal such as copper. The initial copper clad should constitute at least 20% by volume of the composite wire for optimum results.

The effective resistance of a ferrous alloy is much higher than copper under conditions of capacitor operation. For example, a stainless steel wire may have an effective resistance about fifty times that of pure copper wire. Also, a "skin effect" phenomenon exists at high frequencies whereby electrical current is conducted through a thin skin on the surface of a conductor. The apparent effect in a copper-clad capacitor lead wire, wherein the clad is of sufficient thickness, is to shunt substantially all electrical current flow through the copper clad. In other words, the core alloy with its inherently high resistivity is effectively bypassed so that it has substantially no effect on the Q value of the capacitor.

The thermal coefficient of expansion of copper is known to be too high for customary glass to metal sealing. However, the effective radial expansion coefficient of a clad wire is intermediate the coefficients of the core material and the clad material. Consequently, a sufficiently low expansion core material provides a composite wire having an intermediate expansion compatible for fusion sealing to a glass selected for optimum electrical properties. Thus, the core alloy composition, and correspondingly the effective radial thermal coefficient of expansion of the clad alloy wire, may be varied without appreciably affecting the Q value in a capacitor. This permits flexibility in selecting an optimum combination of encapsulation glass and lead wire for both electrical and sealing properties.

By way of specific illustration, a commercial capacitor glass has a thermal expansion of $103 \times 10^{-7}$ cm./cm./° C. as measured between 0° C. and 300° C. We have found that this glass may be satisfactorily sealed to conducting lead wires formed from an alloy core composed of 46% nickel and 54% iron and a clad or plated layer of copper constituting about 20% by volume of the wire. With glasses having a higher expansion value a lower iron content alloy should be employed since this increases the effective radial coefficient of expansion in the wire. Conversely, with glasses having a lower expansion, alloys having an iron content greater than 54% should be employed.

Glass capacitors are customarily assembled in the form of an elongated strip embodying a plurality of capacitors as shown in FIG. 2 and generally designated 28. Relatively long strips or ribbons of glass dielectric, and corresponding lengths of cover glass, are assembled with interleaved rows of spaced foils. The number of metal foils in each row will equal the number of capacitor units desired except as offset to provide terminal portions. Capacitor strip 28 will ordinarily contain from ten to thirty individual capacitors and will ultimately be separated into such individual units by sawing or other known means. The various components are shown in FIG. 1 and are integrally consolidated into strip 28 by passing through pressure rolls while heated to a temperature corresponding to the softening point of the glass employed. This may, for example, be on the order of 500° C. At this temperature, the glass layers soften sufficiently to adhere to each other and to the metal foils under the influence of pressure. While adhesion occurs, there is insufficient glass flow for complete hermetic sealing. The substantially higher temperatures required to achieve adequate flow for complete sealing would damage the dielectric layers. This may be seen from FIG. 3 where glass covers 14 are shown adhered to each other but with their rounded edges substantially unchanged. Accordingly, strip 28 will not be a hermetically sealed unit.

We provide a fused hermetic seal between glass covers 14 and lead wires 16 in a separate sealing operation as schematically illustrated in FIG. 4. In this sealing step, capacitor strip 28 is clamped in a holder 30 mounted on a conveyor 32 with wires 16 in an upright position. Strip 28 is first brought to a temperature of about 450° C. in preheat oven 34 and then carried beneath multi-jet burners 40. The latter are positioned in line with strip 28 and so spaced that their flame jets are directed along the edges of cover strips 14 on each side of the upwardly extending row of lead wires 16 as shown in FIG. 5. In this manner the glass forming the cover edges is quickly softened to such an extent that it flows together into a well formed seal around the wires, holders 30 serving as a barrier or mold to restrict flow of the softened glass. To facilitate this sealing operation, lead wires 16 are preferably pre-beaded with glass, in accordance with conventional sealing practice, in the sealing area of the wire. By using sharply localized heating, undue oxidation of the copper clad on the wires and overheating of capacitor 12 are avoided. Strip 28 is then cooled and reversed in holder 30. The sealing operation is repeated to produce a similar hermetic sealing along the opposite edge of the strip. Various types of known localized heating devices may be substituted for burners 40 for present purposes.

Since it is virtually impossible to completely avoid oxidation of the copper clad, wires 16 will necessarily be cleaned prior to soldering or other assembly operations. It has been found essential, in order to provide adequate high frequency conductivity and consequent high "Q" value, that the copper clad remaining after the sealing operation constitute at least 15% by volume of the conductor. In the event that an undue amount of oxidation occurs, or a particularly high degree of conductivity is ultimately required, additional copper may be plated on the wire leads after the fusion process in any known manner. A particular advantage arising from the hermetic sealing operation is that the lead wires can be cleaned, plated or otherwise chemically treated without danger to the capacitor components.

During the sealing step the fused glass tends to climb on the wire slightly, thereby producing a thin layer, or fillet, that is extremely susceptible to cracking when even small bending stresses are transmitted through the leads. Any checks or cracks developed will tend to cause subsequent failure of the seal when subjected to additional stress. As hereafter described, a further feature of our invention lies in avoiding this condition without appreciably altering the desired electrical characteristics of the capacitor.

At the time strip 28 is mounted in clamp 30 for sealing, a flat, non-vitreous ceramic doughnut, or annular disc, 36 is slipped over wire 16 to rest on the edges of glass covers 14. During the fusion step disc 36 is partially submerged in and fused to the glass surface as shown in FIG. 6. Preferably the disc is provided with a rounded inner edge over which wire 16 may be bent when flexed. We have found that disc 36 greatly strengthens the seal area against cracking or checking. To the extent that checks may develop, the ceramic disc prevents their propagation. As a result a mechanically strong, hermetic seal is provided which effectively excludes moisture.

It is essential that disc 36 be of a non-ferrous material to avoid deleterious lowering of the over-all Q value of the capacitor. For example, substitution of a ferrous alloy washer resulted in a lowering of the Q value by as much as 25%. The ceramic material is selected to match the glass expansion, and, with glasses such as referred to above, a forsterite type composition is particularly suitable. It will also be understood that, while the ceramic washer is integrally sealed to the glass and fits closely around the conductor, it is not sealed to the conductor. This avoids any danger of cracking of the disc during flexure of the conductor wire. However, the glass underneath the disc is hermetically sealed to the wire and maintained so by the disc.

We have found that condensers assembled and sealed in this manner satisfactorily pass prescribed humidity and salt spray tests and at the same time provide a Q value above the minimum limits established in MIL-C-11272A. The minimum limits of this specification are graphically expressed in FIG. 7, wherein the minimum acceptable Q value at 1 megacycle is plotted against capacitance in micro-micro-farads. Line A defines the minimum acceptable Q for a capacitor at any given capacitance and may be described as a line connecting the following characteristic points.

| Q | Capacitance, $\mu\mu f.$ |
|---|---|
| 1,500 | 5 |
| 1,400 | 510 |
| 740 | 10,000 |

By way of illustrating the characteristics of capacitors produced in accordance with our invention, the following table shows the average Q value at 1 megacycle measured on groups of different size capacitors. In the final column is given the minimum acceptable Q value as determined from FIG. 7.

| Capacitance ($\mu\mu f.$) | Q (measured) | Q (specified) |
|---|---|---|
| 180 | 2,000 | 1,450 |
| 510 | 1,900 | 1,400 |
| 5,100 | 1,000 | 840 |

While the invention has been described with reference to a specific capacitor element, it will be understood that various modifications are contemplated within the scope of the invention. In particular, ceramic materials other than glass may be employed as a dielectric in the capacitor element and the element may alternatively be assembled by known metallizing procedures.

What is claimed is:

1. In an encapsulated capacitor assembly comprising a capacitor element composed of electrodes separated by dielectric material and electrical leads attached to the electrodes and extending through a glass casing that encapsulates the element, a fusion seal between each lead and the glass casing, and an annular ceramic disc surrounding each such lead and integrally united with the surface of the glass casing, the seal between the lead and the casing being strengthened against fracture without appreciably altering the electrical characteristics of the capacitor assembly.

2. A capacitor assembly in accordance with claim 1 wherein the ceramic disc is in closely spaced relation to the electrical lead and is fusion sealed to the glass casing surface to extend outwardly therefrom.

3. In a capacitor assembly including a capacitor element composed of electrodes separated by dielectric material, an encapsulating casing for the element composed of glass corresponding in thermal expansion and electrical characteristics to the dielectric material, flexible copper clad ferrous alloy leads attached to the electrodes and fusion sealed in the encapsulating glass, and an annular ceramic disc closely surrounding each lead and being fusion sealed in the encapsulating glass but not to the metal lead, the assembly being characterized by a high Q value and moisture impermeability.

4. A capacitor assembly in accordance with claim 3 wherein both the dielectric material and the encapsulation are composed of a glass having a high Q value and thermal expansion coefficient on the order of $100 \times 10^{-7}$ cm./cm./° C., the encapsulating glass and the capacitor element being pressure sealed into an essentially integral body.

5. A capacitor assembly in accordance with claim 3 wherein the conducting leads are composed of wire having a ferrous alloy core externally coated with copper to a thickness such that the copper amounts to at least 15% by volume of the wire.

6. A capacitor assembly in accordance with claim 3 wherein the ceramic strengthening disc is composed of a forsterite type material.

7. A hermetically encapsulated capacitor characterized by a relatively high Q value which, in terms of a plot of Q values against capacitance in micro-micro-farads, exceeds minimal limits established by a line passing through the point 1500 at 5 micro-micro-farads, 1400 at 500 micro-micro-farads and 740 at 10,000 micro-micro-farads, said capacitor assembly comprising a capacitor element composed of metal foil electrodes separated by a glass dielectric material, the glass having a high Q value and a thermal expansion coefficient on the order of 100 cm./cm./° C., a glass casing encapsulating the capacitor element and integrally united therewith, electrically conducting wire leads connected to the capacitor electrodes and fusion sealed in the glass case, the wires having a ferrous alloy core and an external copper coating constituting at least 15% by volume of the wire, the wire-glass seal being protected against fracture due to bending stresses on the lead by an annular ceramic disc surrounding said lead in closely spaced relationship and integrally united with the external surface of the glass casing.

References Cited in the file of this patent
UNITED STATES PATENTS

| 2,458,748 | Stupakoff | Jan. 11, 1949 |
| 2,696,577 | Smith | Dec. 7, 1954 |
| 2,699,594 | Bowne | Jan. 18, 1955 |
| 2,955,386 | Leinkram | Oct. 11, 1960 |